(12) United States Patent
Cheng et al.

(10) Patent No.: US 7,688,556 B2
(45) Date of Patent: Mar. 30, 2010

(54) ARC-DISCHARGE DETECTION DEVICE

(75) Inventors: Ying-Chang Cheng, Taipei Hsien (TW);
Chin-Biau Chung, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 588 days.

(21) Appl. No.: 11/717,754

(22) Filed: Mar. 14, 2007

(65) Prior Publication Data
US 2008/0225444 A1 Sep. 18, 2008

(51) Int. Cl.
*H02H 3/00* (2006.01)
*H02H 7/00* (2006.01)
(52) U.S. Cl. ........................................... 361/2
(58) Field of Classification Search ............... 361/2, 361/5–7
See application file for complete search history.

(56) References Cited
U.S. PATENT DOCUMENTS 6,867,955 B2    3/2005  Chou et al.
6,940,234 B2    9/2005  Chou et al.
7,518,839 B2 *  4/2009  Chou et al. ............... 361/42
7,598,940 B2 * 10/2009  Chou et al. ............... 345/102

FOREIGN PATENT DOCUMENTS
TW        591839    6/2004
TW        591976    6/2004

\* cited by examiner

*Primary Examiner*—Jared J Fureman
*Assistant Examiner*—Dharti H Patel
(74) *Attorney, Agent, or Firm*—Muncy, Geissler, Olds & Lowe, PLLC

(57) ABSTRACT

The present invention discloses an arc-discharge detection device, which is used to detect the arc discharge persistently occurring in between an inverter and a load during an abnormal power transmission state. The inverter is arranged in a circuit board, and a carbonized loop is defined in an arc-discharge reaction area of the circuit board. In the present invention, a power-variation detection unit is electrically coupled to the carbonized loop and detects the power-level variation caused by the carbonized loop and generates a power-variation signal; an interpretation unit receives the power-variation signal and utilizes a decision level to determine whether the power variation is caused by arc discharge and outputs an abnormal-power signal if the interpretation result is positive; and a trigger unit is driven by the abnormal-power signal to interrupt the inverter's outputting high-voltage power to the load.

9 Claims, 2 Drawing Sheets

ARC-DISCHARGE DETECTION DEVICE

FIELD OF THE INVENTION

The present invention relates to a detection device, particularly to an arc-discharge detection device. When arc discharge results in a carbonized loop on the circuit board where an inverter is installed, the present invention can detect the power-level variation resulting from the carbonized loop and output a triggering signal to interrupt the inverter.

BACKGROUND OF THE INVENTION

When a high voltage is applied to two electrodes, and when the two electrodes are moved to each other gradually, and when a given spacing between the two electrodes is reached, the so-called arc discharge will occur. Arc discharge is similar to the lightning generated by thunderclouds. In contrast to the momentariness of lightning, the electric sparks between two electrodes can persist for a long time and result in heat accumulation.

In electronic circuits, arc discharge usually causes the malfunction or damage of electronic elements, or even a fire, which may endanger life. In the traditional high-voltage loads, such as CCFL (Cold Cathode Fluorescent Lamp), EEFL (External Electrode Fluorescent Lamp), anion generators, cathode ray tubes, etc., arc discharge will occur between the load and the high-voltage power source because of the point discharge resulting from an imperfect contact, a humidity/temperature change or a broken/damaged circuit element. U.S. Pat. No. 6,940,234 and U.S. Pat. No. 6,867,955 disclosed a voltage detection mode to prevent from the arc discharge occurring in a high-voltage output section, wherein a voltage-conversion unit of an arc-discharge protection device receives a high-voltage arc-discharge signal from the high-voltage output section and converts the high-voltage arc-discharge signal into a low-voltage arc-discharge signal; a rectifier unit rectifies the low-voltage arc-discharge signal and outputs an arc-discharge noise; a trigger unit detects the arc-discharge noise and outputs a triggering signal to interrupt a control unit or a driving unit lest arc discharge result in heat accumulation on the peripheral elements, which causes a burnout or a fire. Besides, R.O.C. publication U.S. Pat. No. 591,976 and U.S. Pat. No. 591,839 disclosed arc-discharge protection devices with a current detection mode.

However, the abovementioned voltage detection mode and current detection mode need a complicated circuit, including the voltage conversion unit, the filter unit, the rectifier unit, etc., which increases the fabrication time and fabrication cost and lays a great burden on manufacturers and consumers.

SUMMARY OF THE INVENTION

The primary objective of the present invention is to prevent that arc discharge persistently occurs in between an inverter and a load during an abnormal power transmission state.

To achieve the abovementioned objective, the present invention proposes an arc-discharge detection device to detect the arc discharge persistently occurring in between an inverter and a load during an abnormal power transmission state. The inverter is arranged in a circuit board, and a carbonized loop is defined in an arc-discharge reaction area of the circuit board. The arc-discharge detection device of the present invention comprises the following components: a power-variation detection unit electrically coupled to the carbonized loop and detecting the power-level variation of the carbonized loop and generating a power-variation signal; an interpretation unit receiving the power-variation signal and utilizing a decision level to determine whether the power variation is caused by arc discharge and outputting an abnormal-power signal if the interpretation result is positive; and a trigger unit driven by the abnormal-power signal to interrupt the inverter's outputting high-voltage power to the load.

DETAILED DESCRIPTION OF THE PREFERRED EMBODIMENTS

The technical contents of the present invention are to be described in detail in cooperation with the drawings below.

Figure 1:
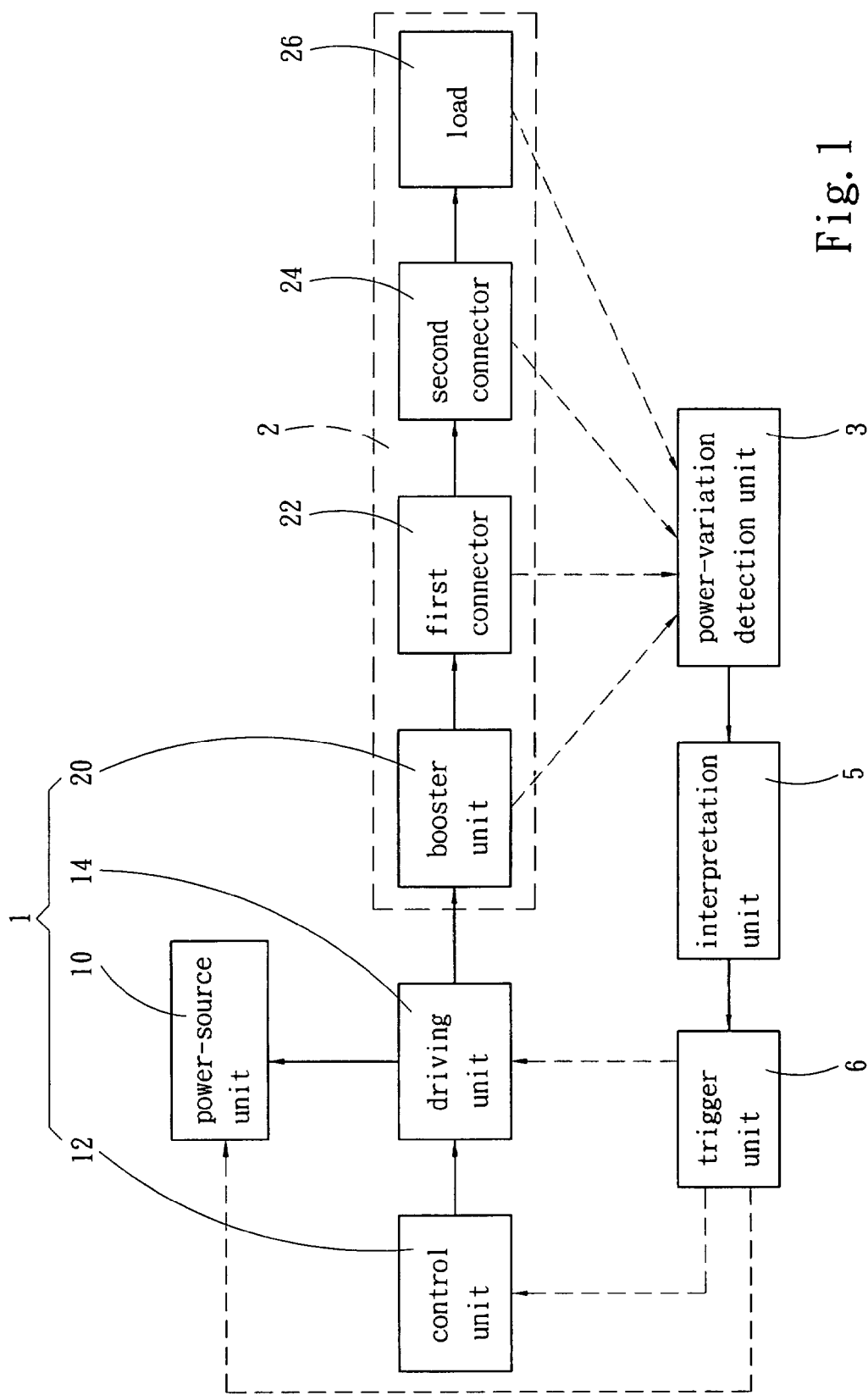
FIG. 1 is a block diagram schematically showing the architecture of the arc-discharge detection device according to a preferred embodiment of the present invention.
Figure 4:
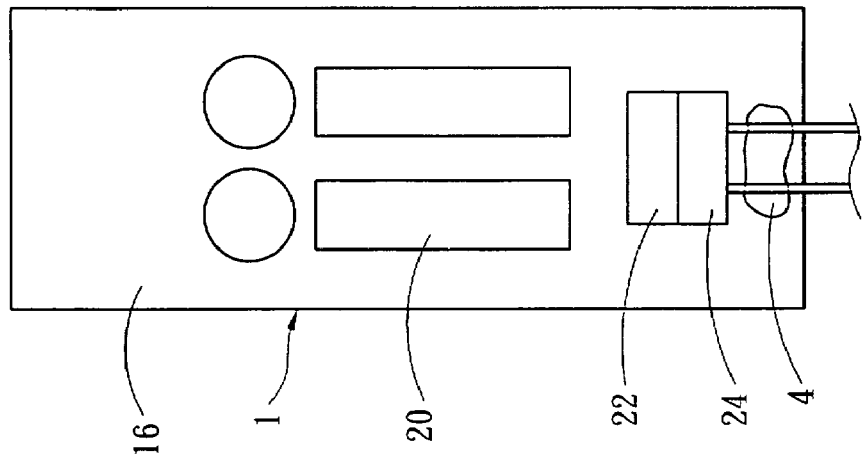
FIG. 4 is a diagram schematically showing the appearance of the arc-discharge detection device according to yet another preferred embodiment of the present invention.
Figure 3:
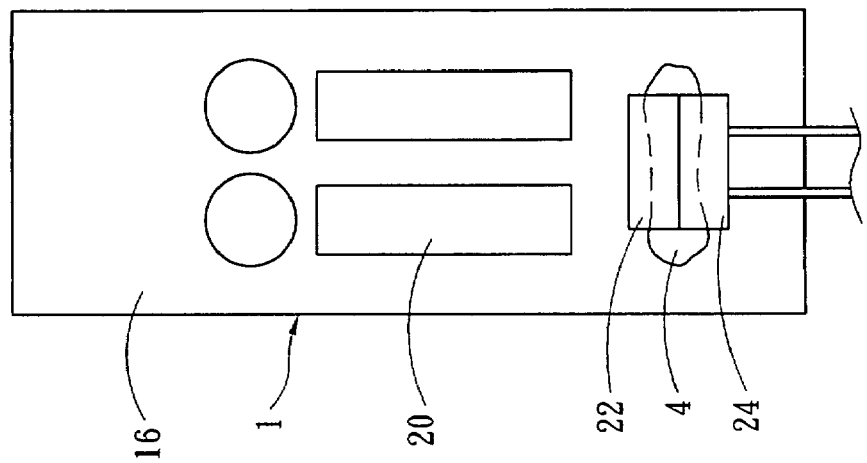
FIG. 3 is a diagram schematically showing the appearance of the arc-discharge detection device according to another preferred embodiment of the present invention.
Figure 2:
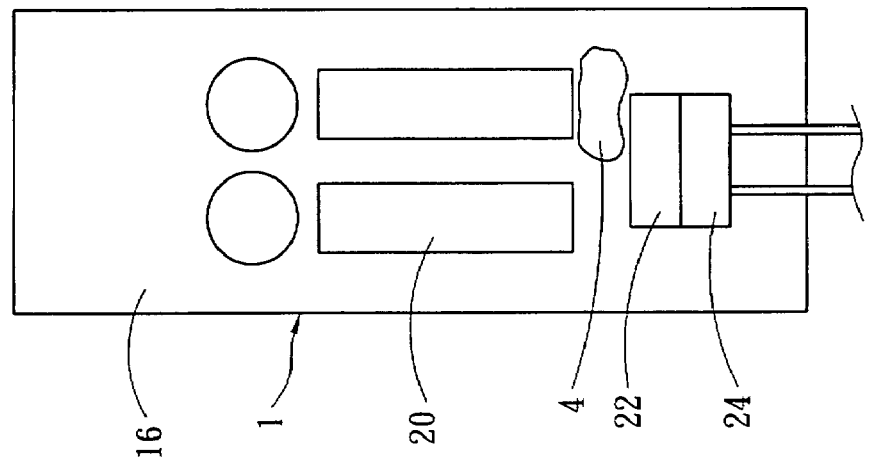
FIG. 2 is a diagram schematically showing the appearance of the arc-discharge detection device according to a preferred embodiment of the present invention.

Refer to FIG. 1 and FIG. 2 respectively a block diagram and a diagram schematically showing the architecture and the appearance of the arc-discharge detection device according to a preferred embodiment of the present invention. The present invention pertains to an arc-discharge detection device, which is used to prevent from the arc discharge persistently occurring in between an inverter 1 and a load 26 during an abnormal power transmission state; for example, there is an imperfect contact, a humidity/temperature change, or a broken/damaged circuit element. The inverter 1 is arranged in a circuit board 16, and a carbonized loop 4 is defined in an arc-discharge reaction area 2 of the circuit board 16. In this embodiment, the inverter 1 includes a power-source unit 10 inputting power, a control unit 12 providing a voltage-distribution signal, a driving unit 14 receiving the power and the voltage-distribution signal and transforming voltage, and a booster unit 20 receiving the transformed voltage and boosting the transformed voltage into a high voltage. The power inputting, voltage distribution, voltage transformation, and voltage boosting of an inverter are not the characteristics of the present invention but the conventional technologies; therefore, those will not repeat herein. The arc-discharge reaction area 2 includes the booster unit, 20, a first connector 22 arranged in the circuit board 16 of the inverter 1, a second connector 24 electrically coupled to the first connector 22 and transmitting high-voltage power to the load 26 at the rear end, and the load 26. The load 26 is an electronic device driven by a high voltage, such as a gas discharge lamp (CCFL, HCFL (Hot Cathode Fluorescent Lamp), or EEFL) or an anion generator. FIG. 2 shows that the carbonized loop 4 is arranged in between the booster unit 20 and the first connector 22. FIG. 3 shows that the carbonized loop 4 is arranged in between the first connector 22 and the second connector 24. FIG. 4 shows that the carbonized loop 4 is arranged in between the second connector 24 and a load (the load is not shown in FIG. 4). The arc-discharge detection device of the present invention comprises the following components: a power-variation detection unit 3, an interpretation unit 5, and a trigger unit 6.

The power-variation detection unit 3 is electrically coupled to the carbonized loop 4 and detects the power-level variation of the carbonized loop 4 and generates a power-variation signal. The power-variation detection unit 3 can acquire the power-state signal of the booster unit 20, the first connector 22, the second connector 24 and the load 26. When the carbonized loop 4 appears in the reaction area 2, the power level will vary in the reaction area 2, which covers from the booster unit 20 to the load 26. For example, when the carbonized loop 4 appears, and if the booster unit 20 is a piezoelectric transformer and supplies a voltage of 300V to the load 26, the voltage supplied by the booster unit 20 will be lowered to only 100V because the piezoelectric transformer can modulate the output voltage according to the rear-end impedance via the resonance characteristic thereof, and because the impedance of the carbonized loop 4 is usually far lower than that of the load 26.

The interpretation unit 5 receives the power-variation signal and utilizes a decision level to determine whether the power variation is caused by arc discharge and outputs an abnormal-power signal if the interpretation result is positive.

The trigger unit 6 is driven by the abnormal-power signal to interrupt the inverter 1's outputting high-voltage power to the load 26 to stop arc discharge. In this embodiment, the trigger unit 6 may trigger the power-source unit 10, the control unit 12 and the driving unit 14 to interrupt the inverter 1's outputting high-voltage power to the load 26. The trigger unit 6 is a switching device, such as a silicon-controlled rectifier, a flip-flop or a transistor. The switching device is driven by the abnormal-power signal to shut off the inverter 1.

In this embodiment, the carbonized loop 4 is only defined in the circuit board 16 where the inverter 1 is installed. However, in practical application, the carbonized loop 4 can be defined in any circuit board in the rear end of the booster unit 20; thereby, the power-variation detection unit 3 can generate the power-variation signal once it detects the power-level variation of the carbonized loop 4.

In this embodiment, the trigger unit 6 triggers the power-source unit 10, the control unit 12 and the driving unit 14 to interrupt the inverter 1's outputting high-voltage power to the load 26. However, in practical application, the trigger unit 6 may also trigger a switch (not shown in the drawings) of the booster unit 20 to interrupt the inverter 1's outputting high-voltage power to the load 26.

Besides, the arc-discharge detection device of the present invention can cooperates with the voltage detection mode disclosed in the U.S. Pat. No. 6,940,234 and U.S. Pat. No. 6,867,955 or the current detection mode disclosed in the R.O.C. U.S. Pat. No. 591,976 and U.S. Pat. No. 591,839 to attain a dual-mode protection. Once one mode thereof fails, the other mode can still protect the circuit. Thereby, the arc-discharge protection is enhanced.

Further, the power-variation detection unit 3 may be a feedback circuit (not shown in the drawings), which acquires the high-voltage power output by the booster unit 20 and transforms the high-voltage power into a detection signal and outputs the detection signal to the control unit 12; thereby, the control unit 12 can modify the voltage-distribution signal according to the high-voltage power output by the booster unit 20. Furthermore, the driving unit 14 may be a switching device; according to the high-voltage power output by the booster unit 20, the feedback circuit can modulate the driving unit 14 to determine the turn on/off of the power-source unit 10 and the booster unit 20.

Summarily, in the present invention, a power-variation detection unit 3 is used to detect the power-level variation caused by a carbonized loop 4 generated by arc discharge and generates a power-variation signal; an interpretation unit 5 is used to recognize an abnormal-power signal; then, a trigger unit 6 is driven by the abnormal-power signal to interrupt the inverter 1's outputting high-voltage power to the load 26. The present invention can utilize the simple and low-cost circuit of the power-variation detection unit 3 to achieve the same arc-discharge protection effect as the conventional technologies. Then, the fabrication time is shortened, the fabrication cost decreased, the burden of manufacturers and consumers reduced, and the competence promoted. Therefore, the present invention indeed possesses novelty and non-obviousness and meets the requirements of a patent. Thus, the Inventors file the application for a patent. It will be greatly appreciated if the patent is approved fast.

The preferred embodiment has been described in detail above to exemplify the present invention. However, it is not intended to limit the scope of the present invention. Any equivalent modification or variation according to the spirit of the present invention is to be also included within the scope of the present invention.

What is claimed is:

1. An arc-discharge detection device, which is used to detect the arc discharge persistently occurring in between an inverter and a load during an abnormal power transmission state with said inverter arranged in a circuit board and a carbonized loop defined in an arc-discharge reaction area of said circuit board, comprising the following components:
   a power-variation detection unit electrically coupled to said carbonized loop and detecting a power-level variation caused by said carbonized loop and generating a power-variation signal;
   an interpretation unit receiving said power-variation signal and utilizing a decision level to determine whether the power variation is caused by arc discharge and outputting an abnormal-power signal if the interpretation result is positive; and
   a trigger unit driven by said abnormal-power signal to interrupt said inverter's outputting high-voltage power to said load.

2. The arc-discharge detection device according to claim 1, wherein said trigger unit is a silicon-controlled rectifier.

3. The arc-discharge detection device according to claim 1, wherein said inverter includes a power-source unit inputting power, a control unit providing a voltage-distribution signal, a driving unit receiving said power and said voltage-distribution signal and transforming voltage, and a booster unit receiving the transformed voltage and boosting said transformed voltage into a high voltage.

4. The arc-discharge detection device according to claim 3, wherein said power-variation detection unit is a feedback circuit, which acquires the high-voltage power output by said booster unit and transforms said high-voltage power into a detection signal and outputs said detection signal to said control unit; thereby, said control unit can modify said voltage-distribution signal according to said high-voltage power output by said booster unit.

5. The arc-discharge detection device according to claim 3, wherein said trigger unit triggers said control unit to interrupt the output of said high-voltage power.

6. The arc-discharge detection device according to claim 3, wherein said trigger unit triggers said driving unit to interrupt the output of said high-voltage power.

7. The arc-discharge detection device according to claim 3, wherein said trigger unit triggers said power-source unit to interrupt the output of said high-voltage power.

8. The arc-discharge detection device according to claim 3, wherein said booster unit is a piezoelectric transformer.

9. The arc-discharge detection device according to claim 8, wherein said power-variation detection unit acquires said power-level variation caused by said carbonized loop via the resonance characteristic of said piezoelectric transformer.

* * * * *